(12) United States Patent
Long et al.

(10) Patent No.: US 11,087,095 B1
(45) Date of Patent: Aug. 10, 2021

(54) PLATFORM FOR QUALITY ASSURANCE IN NATURAL LANGUAGE GENERATION FRAMEWORKS

(71) Applicant: STATS LLC, Chicago, IL (US)

(72) Inventors: Adam Long, Durham, NC (US); Robert Allen, Durham, NC (US); Anne Johnson, Durham, NC (US)

(73) Assignee: STATS LLC, Chicago, IL (US)

( * ) Notice: Subject to any disclaimer, the term of this patent is extended or adjusted under 35 U.S.C. 154(b) by 800 days.

(21) Appl. No.: 14/627,717

(22) Filed: Feb. 20, 2015

(51) Int. Cl.
*G06F 40/40* (2020.01)
*G06F 40/103* (2020.01)
*G06F 16/35* (2019.01)

(52) U.S. Cl.
CPC ............ *G06F 40/40* (2020.01); *G06F 16/353* (2019.01); *G06F 40/103* (2020.01)

(58) Field of Classification Search
None
See application file for complete search history.

(56) References Cited

U.S. PATENT DOCUMENTS

| | | | |
|---|---|---|---|
| 8,630,844 B1* | 1/2014 | Nichols | G06F 17/2264 704/1 |
| 2006/0053105 A1* | 3/2006 | Sanchez | G06F 17/30867 |
| 2014/0279389 A1* | 9/2014 | Monaco | G06Q 40/025 705/38 |
| 2014/0282362 A1* | 9/2014 | Sellers | G06F 17/2705 717/104 |
| 2015/0279390 A1* | 10/2015 | Mani | G06F 17/30719 704/235 |
| 2016/0098394 A1* | 4/2016 | Bruno | G06F 17/2785 704/9 |

* cited by examiner

*Primary Examiner* — Richa Mishra
(74) *Attorney, Agent, or Firm* — DLA Piper LLP (US)

(57) ABSTRACT

The present invention is a system and method for optimizing the narrative text generated by one or more narrative frameworks that utilize data input from one or more data sources to drive the creation of a narrative text output. Narrative text is generated in accordance with sets of data that provide the scope of text to be generated. A Quality Assurance module presents the narrative text output to a user that reviews both the condition and the logic evaluation associated with the scope, and the quality of the generated text. A log of Quality Assurance items is created upon review of the generated text. These items are then later resolved by locating them in a narrative text generation data structure to resolve the identified issues.

20 Claims, 8 Drawing Sheets

PLATFORM FOR QUALITY ASSURANCE IN NATURAL LANGUAGE GENERATION FRAMEWORKS

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

As content providers have moved to broaden and deepen their own news and other media offerings, they have accordingly sought ways to improve efficiency and minimize the cost of content generation. Content generation produced in a narrative language context is particularly difficult and costly to provide, but highly desired by clients of systems that produce news and other text media offerings. Building a framework for automatic generation of narrative language text from incoming data minimizes the need for human interaction in the creation of narrative language text, and presents a cost efficient method for the transforming data into narrative language text. Quality control in the output from such systems is of critical importance and not easily accomplished. The systems and methods described herein relate generally to automatically reviewing and maintaining the quality of programmatically generated narrative content.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a network can be any computer or information network capable of marshalling, transmitting, routing, directing and/or forwarding data between two or more hardware devices and/or software modules. For example, a network can be a local area network (LAN), a wide area network (WAN), a wireless network, cloud-based networks, or the Internet. A network can include one or more wired and/or wirelessly connected hardware devices including servers, computers, tablets, mobile devices, and handheld devices.

References throughout this document to code can be, but are not limited to, micro-code or micro-instructions, machine instructions, such as produced by a compiler, script created code, code used to produce a web service, and files containing higher-level instructions that are executed by a computer using an interpreter. For example, embodiments may be implemented using Java, C++, or other object-oriented programming languages and development tools. Additional examples of computer code include, but are not limited to, control data, encrypted code, and compressed code.

Reference throughout this document to a processor can be any processor (e.g., a central processing unit (CPU), an application-specific integrated circuit (ASIC), a field programmable gate array (FPGA)) configured to execute one or more instructions received from, for example, a memory device or construct. In an exemplary embodiment, the processor can be a Reduced Instruction Set (RISC) processor. In an exemplary embodiment, the processor may send information (e.g., data, instructions and/or network data packets) to and/or receive information from any memory device or network card in data communication with the processor.

Reference throughout this document to a memory can be any memory device or implementation, for example cloud-based storage devices, RAM, ROM, a hard disk drive, an optical drive, or other removable media configured to store information.

Reference throughout this document to a relational database, including one or more relational database tables, can be any relational database such as, for example, the relational database engine provided by Oracle, Microsoft SQL Server, MySQL, PostgreSQL, Informix and/or other databases that create and maintain databases using relational structures and database management software.

Reference throughout this document to a data store can be any data store such as a third party Application Programming Interface into a data source, a relational database, a non-relational database, or a file. The data store can also indicate stores of data files that are in comma separated value (CSV) formats or data stored in a tabular format, such as spreadsheets as one example.

Reference throughout this document to Software as a Service (SaaS) refers to a software licensing and delivery model in which software is licensed on a subscription basis and is centrally hosted. It is sometimes referred to as "on-demand software". SaaS is typically accessed by users using a thin client via a web browser.

Reference to "tone" in this document refers to the mood of the generated narrative content created through the use of figurative language, point of view and word choice. In a non-limiting example, a positive performance tone for generated narrative content can be associated with a positive, sanguine, energetic, hopeful, or other similar mood to the generated narrative content.

Reference to "theme" in this document refers to content associated with and/or based at least in part on a given theme, such as a series of events, an ongoing topic of interest, a predefined author style, such as writing or composition style of a given author, journalist or other individual. In a non-limiting embodiment, a narrative framework can include phrases and/or phrase variations constructed in a similar style, fashion and/or manner to those of the author, journalist or other individual.

Reference throughout this document to a "narrative framework" refers to a data construct or module implemented in software and maintained in a hardware storage device and can include phrases and/or other kinds of information and structural and/or data connections between the phrases and other information contained within the narrative framework.

Reference throughout this document to a Graphical User Interface ("GUI") may include displays having message areas, interactive fields, pop-up windows, pull-down lists, notification areas, menus, tabs, and/or buttons that can be operated by the user. The GUI may include multiple levels of abstraction including groupings and boundaries. It should be noted that the term "GUI" may be used in the singular or in the plural to describe one or more GUI's, and each of the displays of a particular GUI may provide the user of a client device with a user-friendly interactive environment and information.

Reference throughout this document to a "post" refers to the text output from the narrative framework for a particular scope when generating a text article or report.

Reference throughout this document to "scope" refers to the data that makes a particular post unique and different from all other posts.

One object of the present invention is to provide systems and methods for the generation of narrative language text from input data that is customized for particular industries, use cases, and users and a process for assuring the quality of generated narrative text articles meet the standards of review of Quality Assurance editors. The generation of narrative language text begins with a project. A project is a container that has everything necessary to implement a natural language generation application for a particular customer or user. In a non-limiting example, a project may be a container for a data set stored in a database, user calculations as part of the data set, narrative frameworks, data modeling and relationships between data tables, columns, rows, and fields, and the identification of memberships within projects. A project is instantiated and given a name for reference.

In an exemplary embodiment, a project presents a system and method for optimizing data driven natural language text by configuring and retrieving unique groupings of data from one or more data sources. An application server evaluates a condition and an associated origin structure to generate a set of customized segments of narrative text and presents selected segments of narrative text for review. A quality assurance module in the application server reviews each segment of narrative text associated with the origin structure, capturing the origin structure when a segment of narrative text is selected, and storing the origin structure with optimization instructions for the narrative text in a log maintained on an electronic storage device. The system updates one or more segments of narrative text based upon the optimization instructions, to subsequently publish the updated one or more segments of narrative text.

In an embodiment, a condition is evaluated based upon input data from the data source and associated logic of an origin structure and performed in a processor having access to the origin structure and data sufficient to perform a Boolean evaluation and generate a Boolean result for the condition. The condition may be evaluated through a recursive Boolean evaluation, and the condition directs the creation of narrative text in the form of natural language text strings.

In this exemplary embodiment, an input data source may be a relational database, a non-relational database, an excel file, a file in JavaScript Object Notation (JSON) format, an XML file, a spreadsheet, or a file in a comma separated value (CSV) format. An origin structure may be a condition that evaluates to a Boolean result and the Boolean evaluation is performed in a processor having access to logic and data sufficient to perform the Boolean evaluation, where the condition may also be a recursive Boolean evaluation.

In an embodiment, the evaluated condition directs the creation of natural language text strings. The condition selection comprises input evaluation criteria where the evaluation criteria may comprise a Boolean value, selection of one of more than two conditions or selection of a branch condition based upon a logical valuation.

To maintain the quality of the articles produced by a narrative text generator for any given project, a quality assurance (QA) function is automatically applied to the generated text. The QA function associated the branch, embedded branch, condition, and or variation for each portion of generated text in all posts, for each scope requested. The QA function may also scan automatically for errors in spelling and grammar and presents these markings to a QA editor upon review of the generated text for each post. The QA function provides a QA editor with the ability to mark any sentence or word within the generated narrative text with an identifier, note concerning a QA issue, and an indication of the severity of the QA issue. Each identifier may be presented as a visual error badge that indicates how many total errors exist within a generated text article. An error may be automatically generated by the system or by a user and may be defined as incorrect words, sentence inconsistencies, grammar infractions, tone inconsistencies, and word choices inconsistent with the scope within the narrative text analyzed.

Upon the generation of natural language text, a quality assurance display with a view of the generated natural language text associated with the condition that generated each portion of the generated natural language text is presented in the quality assurance display. The generated natural language text is highlighted when a pointing device, such as a cursor, is positioned on said text in the display, and the condition and logical valuation that generated the highlighted text is preserved. The branch, condition, and variation combination that generated the highlighted text is presented in a text edit display when the highlighted text is selected by a user.

A project connects to a data store, where the data store may be a third party API, SQL-based relational database, a non-relational database, a Comma-Separated Value (CSV) file, or a flat file, by starting the database engine and opening a channel to the database engine. The data queries may be created in any format consistent with interfacing to and accessing data within a data store. The accessed data store may contain the source data that is used to generate mathematical insights and language in natural language text. In a non-limiting example, a CSV file, such as a spreadsheet, may be imported as the data source for the subsequent articles generated in the narrative text.

After the data file is imported into the narrative text generation application, a user may execute the narrative text generator against a list of scopes to generate a plurality of posts for the user's consideration. The scope of the posts is selected by the user and permits the user to filter all of the input data from the data input file to just the data rows in which the user has an interest in the scope. The user may then initiate the narrative text generator using the data rows selected by the user and generate a series of posts.

The QA module may also collect operational data and metadata and present metrics and analytics associated with generated posts. These metrics may include how many posts have been run, timing for generated text for all posts and on a per post or per user basis, scope of posts, completed posts, error posts, associated user, and actions taken to control post runs. The QA module may also present analytical data for system performance measures over time, scope analysis per user, actions associated with users and frequency, as well as other analytical measures as may be desired to provide data on system use. In a non-limiting example, a user may be presented with a view of selected scopes and completed posts for the selected range of scopes selected by the user. The user may click on a "completed post" identifier to be presented with a list of posts that have been successfully generated by a particular run. Upon selecting a view option for a particular post, a view of that post is presented to the user and the QA function is initiated.

As part of the narrative text generator function, the posts are submitted to a QA module that is operative to implement the QA function. The QA module function may check each generated post for errors in spelling and grammar and marks any sentence or word within the generated narrative text with an indication of the branch, embedded branch, condition, and/or variation combination that generated the particular portion of generated narrative text. This origin for each portion of the generated narrative text is saved within the system for presentation to a QA user during QA review of the generated narrative text in each post.

The user may be presented with the generated narrative text for a particular post in a display panel with the description for any QA issues in a second display panel on the same screen display, but not obscuring the generated text for the post. The QA issue description may be selected by the user to permit the user to insert an action associated with a QA issue that is discovered by the user in the generated text of the article. The view is accessible to QA users permitting the identification of logical, grammatical, spelling, style, and/or scope errors. Identified QA issues may be presented to the user in a display pane dedicated to recording and displaying QA items as they are identified or upon later retrieval from the QA log of all QA items identified in posts and stored in the QA log.

In an exemplary embodiment, the user may drag the mouse over text displayed in the QA post view display pane. The system may dynamically associate branches, embedded branches, conditions, variations, or any combination of these elements that are the genesis of that particular section of the text highlighted by the mouse cursor. If there is a QA issue with the selected text, a user may click on the text and be presented with the specific variation of branch and/or embedded branch that was the source of the QA issue. The user may then be presented with the specific branch, embedded branch, condition, and variation location within the narrative framework that generated the selected narrative text so as to facilitate the correction of the QA issue. The user may choose to edit the text directly to address the QA issue, remove the issue as not being of concern, or click on a link associated with the QA issue that has been retrieved from a QA log. If the user chooses to click on the link, the narrative text editor will replace the QA display and present the user with a view focused on the QA issue branch, condition, and variation combination. This presents the user with the exact location within the narrative text that generated the QA issue. With the knowledge of the exact branch, condition, and variation the user may quickly address the QA issue, provide information about the issue, correct the branch, condition, or variation that generated the error, or otherwise resolve the QA issue.

In an exemplary embodiment, when a user identifies a QA issue they may select the highlighted portion of the generated text to input information about the QA issue discovered. In this situation, the user is presented with an input display box that permits the user to input a note about the QA issue discovered. A user may also indicate a level of severity for the discovered QA issue and choose to save the note to the QA issue database. There is also a cancel option present if the user decides not to log the QA issue to the database, or decides that the discovered discrepancy in the text does not merit recognition or logging in the system.

Once a QA issue has been saved, it is listed as a QA item within the display pane dedicated to recording and displaying all input QA items. A user may then edit the item displayed in the display pane, remove it from consideration, or click a link created by the QA function that is associated with that QA item. Upon clicking the link, the user may be taken directly to a narrative text editor display view that is focused on the branch, condition, and variation combination that generated that specific section of the text article.

The entry of QA items by a user creates a log of all QA items as they are identified, in addition to those QA issues that are automatically placed in the log by QA system checks. A user may both identify and correct QA issues in a set of continuous operations. The logging of QA items permits the separation of the identification and correction of QA items. In this manner, QA items may be identified by one user and the log of QA items later presented to another user to permit that user to perform the correction at a later time. In this fashion, the identification and correction of QA items may be performed in a more flexible manner based upon time and manpower availability.

When QA items are to be corrected, after identification, a user is presented with a narrative text editor display that presents one or more error badges. The error badges may be any shape or color, but are generally represented as a simply graphical shape in a color that contrasts sharply with the background of the display and has displayed within the error badge a number indicating the error count for each branch, condition, and variation in the narrative text generation framework used to create the post.

The user may select the error badge for any branch, condition, or variation to view that item. Upon selecting an error badge, the system may display a panel dedicated to explanations associated with QA issues. This QA panel will display a description of the QA issue for the branch, condition, or variation associated with that particular error badge.

Upon completion of the QA review by a user, or third party designated by the user, generated posts are considered suitable for publication. The system may publish the completed posts on an automated schedule, the system administrator may choose to publish the completed posts on an ad hoc basis, or the completed posts may be stored for later publication, research, or other use.

Figure 1:
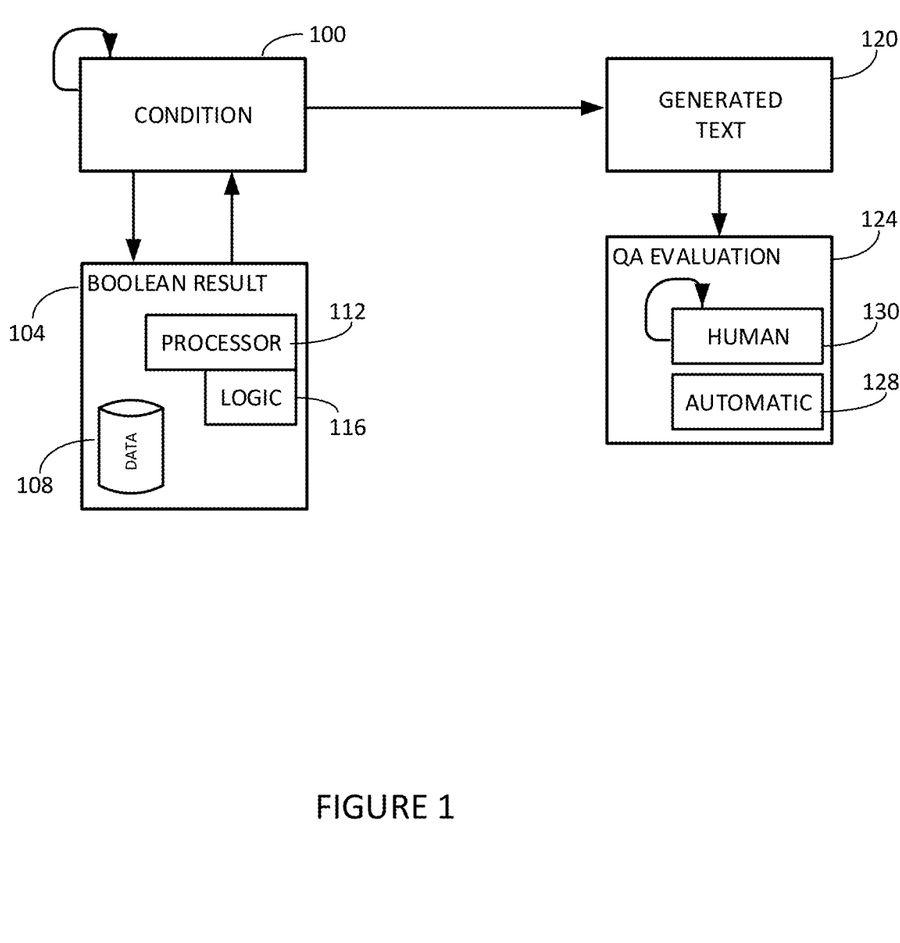
FIG. 1 is an exemplary view of a narrative text evaluation and quality assurance function consistent with certain embodiments of the present invention.

With regard to FIG. 1, this figure presents a narrative text evaluation and quality assurance function consistent with certain embodiments of the present invention. The primary focus of a project is the creation and optimization of narrative text generated in natural language, where the narrative text represents data input from a data source evaluated to a Boolean result based upon a logical origin structure for the text generation. In this figure, the text generation project begins with a condition 100 to be evaluated for inclusion in the generated narrative text.

In an exemplary embodiment, a Boolean result 104, wherein the condition 100 evaluates to one of two possible condition results, is achieved for the condition 100. The evaluation proceeds by accessing data from one or more input data sources 108 and importing the data into a processor 112. The processor 112 evaluates the incoming data using an origin structure that has a logical structure 116 for use in the evaluation activity. In a non-limiting example, the origin structure may present a logical hierarchy that is composed of branch that represents a particular data point to be evaluated, where the branch presents a different result based upon a condition to be selected, and variations that may be included to provide different text strings to provide variety in the resulting generated text.

In an embodiment, the condition evaluation may proceed for an open-ended number of conditions in order to evaluate all incoming data from which narrative text is to be generated 120. The generated narrative language text 120 is provided to a Quality Assurance (QA) evaluation module 124. The generated narrative language text 120 may be evaluated automatically by the QA evaluation module 124 for spelling, grammatical, or other QA issues that are pre-determined by the evaluation system. Additionally, the generated narrative language text 120 may be evaluated by one or more human QA specialists 130. The human QA specialists 130 may input additional QA issues upon review of the generated narrative language text 120. All QA issues are stored into a log that contains all QA issues generated either automatically by the QA evaluation module 124 or by the one or more human QA specialists 130. The QA issue log may be stored in a database associated with the processor and used to resolve all QA issues, either as they are identified or at a later time. The resolved QA issues result in generated natural language text that is optimized for quality of writing that then may be published to one or more venues such as, by way of example and not of limitation, email, web pages, news aggregators, physical publications, blogs, or any other venue that disseminates text for user consumption.

Figure 2:
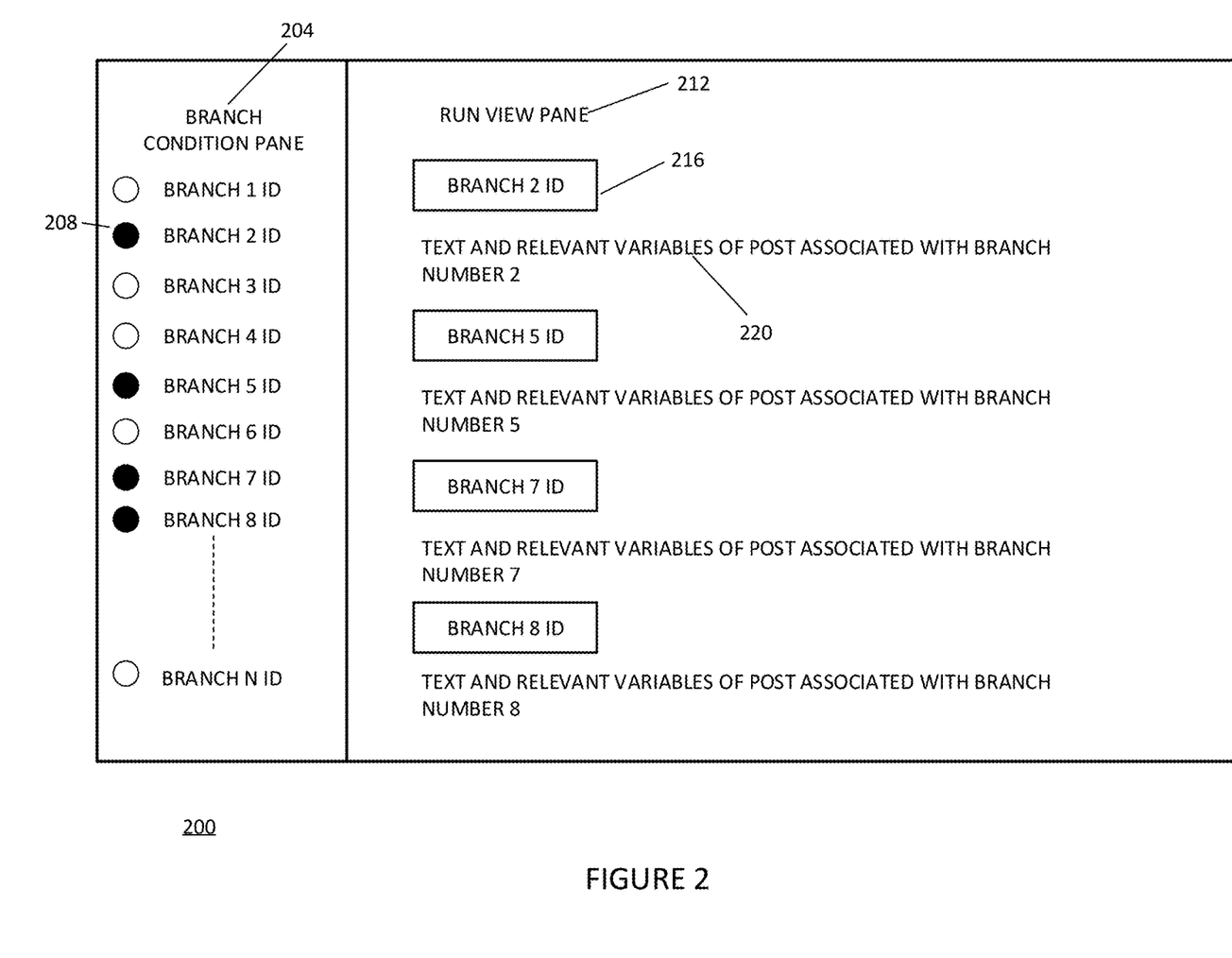
FIG. 2 is an exemplary view of a narrative text generator function consistent with certain embodiments of the present invention.

With regard to FIG. 2, this figure presents a narrative text generator function consistent with certain embodiments of the present invention. When a project is first created, it comprises a narrative generator and one or more data sources. As a function of the project, a user may desire to review the results created by the narrative text generator to optimize the generated text as to provide assurance that the quality of the generated text meets the user's standards prior to publishing the post to a client. To initiate this function, the user is presented with a view of data for which posts may be generated 200.

In an exemplary embodiment, a project presents a system and method for optimizing data driven natural language text by configuring and retrieving unique groupings of data to be retrieved from one or more data sources in an application server that is operative to render one or more narrative frameworks into a set of customized posts and presenting selected customized posts on a display for review. A condition is evaluated in a processor to a Boolean result based upon input data from the data source and associated logic of the origin structure. In this embodiment, posts may be narrative text generated from the evaluated condition. The posts are customized for particular objectives and each segment of narrative text is associated with an origin structure. The origin structure is presented to a user when a segment of narrative text is selected, and the origin structure is stored with optimization instructions in a log maintained on an electronic storage device, where the natural language text is updated based upon the optimization instructions.

In an exemplary embodiment, the display 200 presents the user with an ability to define the scope of the data for which posts are to be generated. The branch condition pane 204 of the display provides a list of branches 208 the user may select that are to be included in the scope of the generated post for review. The run view pane 212 presents the user with the list of selected branches 216. Each branch is composed of the text and relevant variables 220 associated with that branch and from which a narrative text sentence will be generated for inclusion in the post. The scope of the data presents the aspect of the data that makes a post unique, providing the user with an ability to modify any generated post to generate text having a particular style, tone, or data aspect. After the user has completed selecting the branches, which include the data values from the data source in which the user is interested, the narrative text generator function will be executed against the data source to generate a set of posts.

In an exemplary embodiment, a run is defined as a batch job executed by the narrative text generator on a list of scopes selected by a user to create narrative text posts. A user may initiate a new run by passing in a list of selected scopes, as associated with branch and data values, and select a run option in the narrative text generator (not shown). The narrative text generator is optimized to create narrative text as quickly as possible by segmenting and parceling the text generation work to one or more worker servers. The user establishes contact with an application server through a web-based interface and issues a command to start a "run"

of articles, which is a new update to data that is to be imported into a narrative framework to create a number of natural language text articles for each enumerated post in the request.

The worker servers are process servers that may spawn, pick up jobs, and access the narrative generator framework and the database(s) needed to process all posts for which the worker server has been tasked. The worker servers may exist upon a resident server, may be instantiated on one or more network connected servers, or may exist as server capability maintained within a cloud-based expanding set of servers. A worker server may establish one or more data connections to data sources. Data sources may be co-located with the worker server(s) within the cloud, or may exist within other machines or devices connected through network data communications.

In this manner, the system may be scaled up to handle any size work load from small to very large as quickly as the available resources permit. As batch jobs complete, the system may collect and provide to the user metrics about the run such as, in a non-limiting example, scope, posts, completed posts, posts with errors, timing information, and actions to control any run that is ongoing.

The user may view completed posts for any run. A list of the scope identifiers may be presented that the user has selected to be included in the completed run. A post list provides the user with post identifier for each completed post, an identification of the row number for that particular post tying the post back to the database row within the data source from which the data for the post was derived, and a view selection capability.

The user may choose which post to view for quality assurance purposed by selecting the view button associated with any post id in the post list. Upon selection of the view button the completed post view is replaced by a view of the narrative text that has been generated for that selected post.

Figure 3:
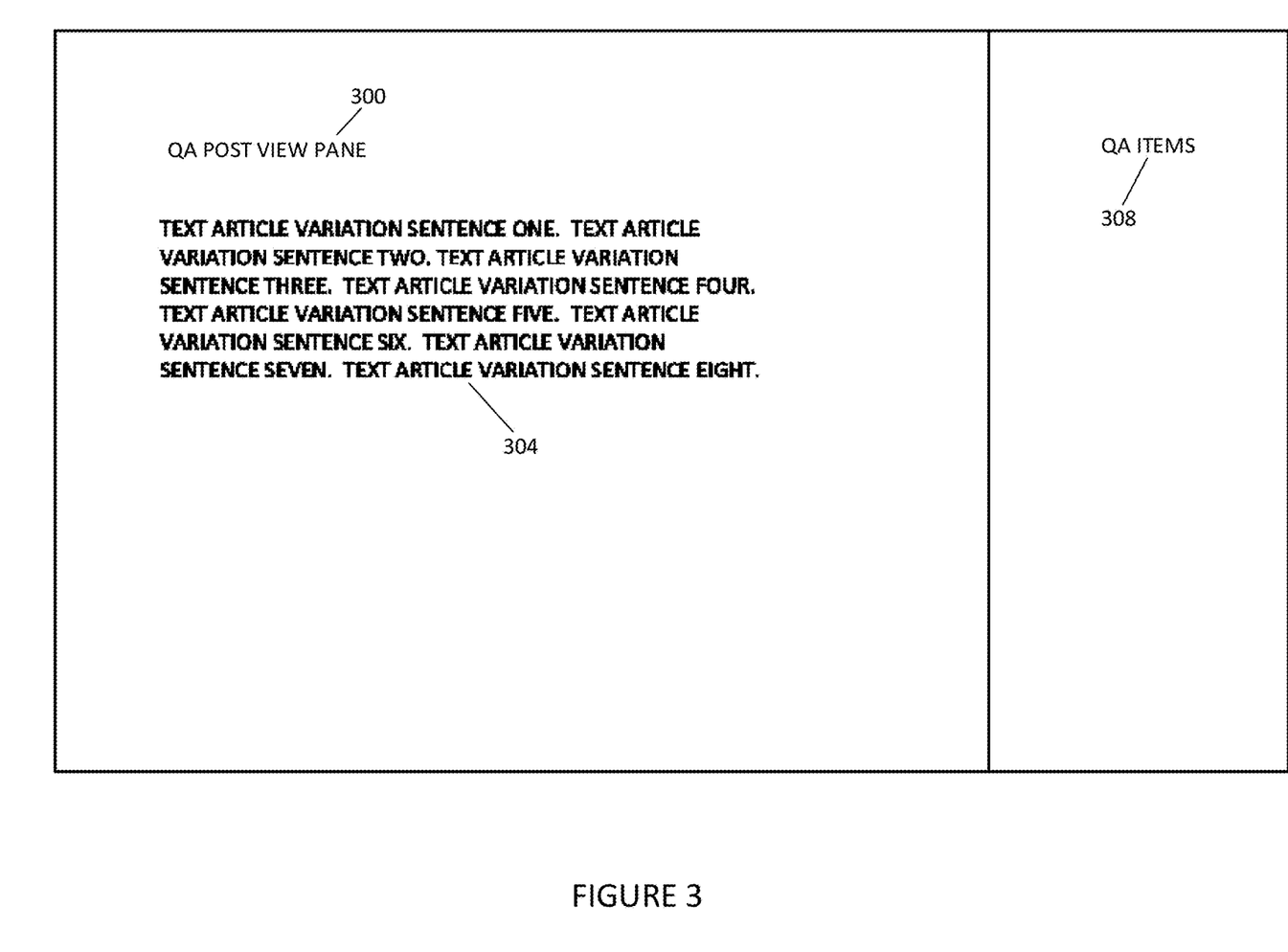
FIG. 3 is an exemplary view of a selected post display for QA consideration consistent with certain embodiments of the present invention.

With regard FIG. 3, this figure presents an exemplary view of a selected post display for QA consideration consistent with certain embodiments of the present invention. The display provides the user a QA post view pane 300 in which the generated narrative text 304 for one particular post generated according to the scope selected by the user is presented in full. A second QA item pane 308 is available to the user to access and view QA issues as they are defined. This view is accessible to QA users, either immediately after the post is generated or when a stored post is retrieved from a storage location, to permit the QA user to check for logical, grammatical, spelling and style errors to permit a feedback mechanism for the quality of the generated text output for each post within a run.

Figure 4:
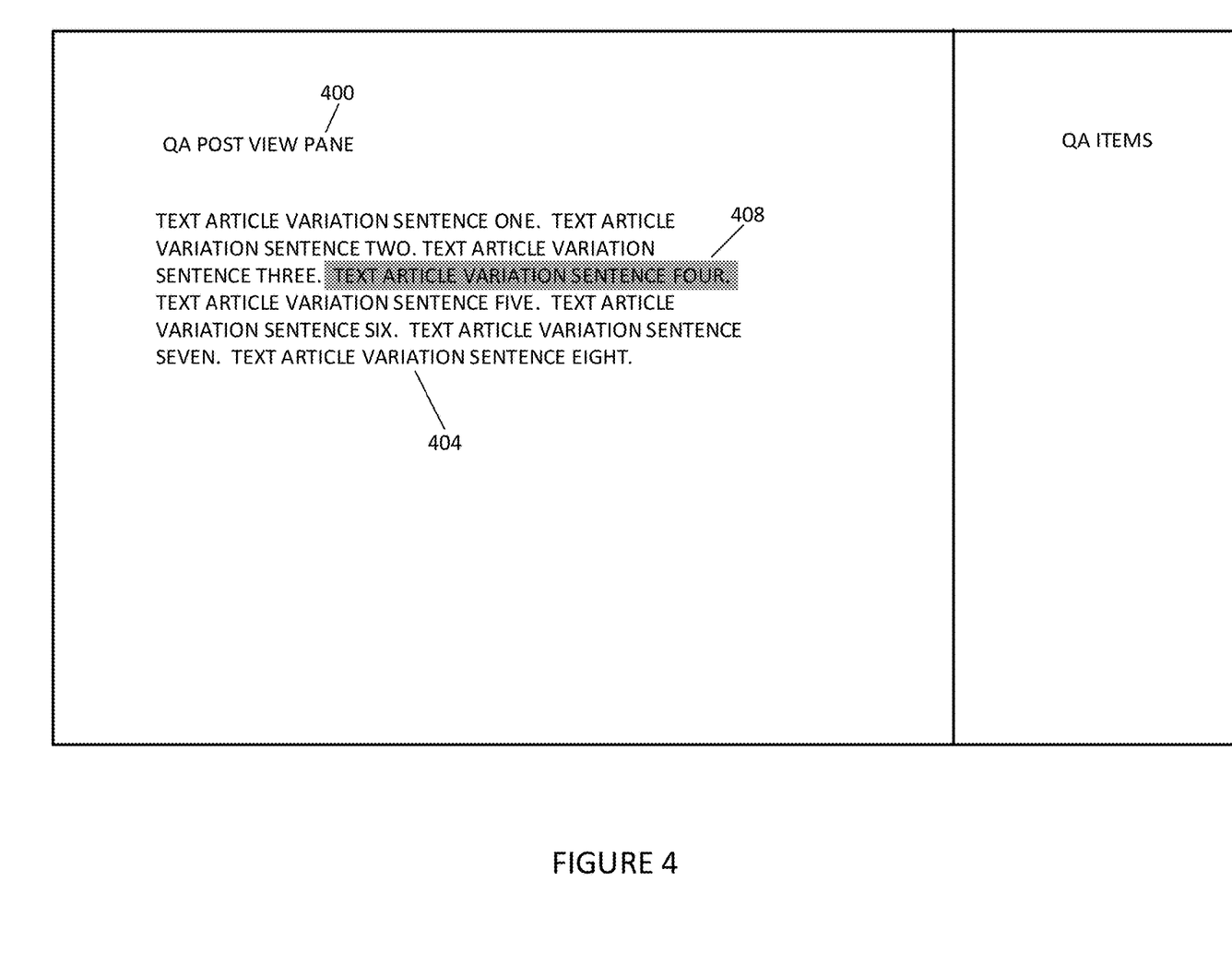
FIG. 4 is an exemplary view of an identification capability within generated text consistent with certain embodiments of the present invention.

With regard to FIG. 4, this figure presents an exemplary view of an identification capability within generated text consistent with certain embodiments of the present invention. In an exemplary embodiment, the user may access the QA post view pane 400 by moving the cursor through the action of a mouse or other input device over the text of the post 404 presented in the QA post view pane 400. As the user moves the cursor over the text of the post 404, the QA function is operative to dynamically highlight 408 the branches and embedded branches that generated the text thus highlighted 408.

Quality assurance checks may be performed automatically by a software module that checks for spelling and grammatical errors in the generated text. These automatically generated QA issues are logged and presented as portions of the text display having a different color, shading, background, or other indication that there is an issue with this portion of the generated text. Additional checks may be made either through more advanced automatic checks or by one or more users performing visual inspection of the generated text.

The user responsible for performing quality assurance checks is known as the QA user. The QA user may perform visual checks of the narrative text for the post and move the cursor to highlight any text that is of concern for any QA issue. Upon highlighting the text, the QA user simply clicks on the highlighted text to be presented with the branch, condition, and variation used by the narrative text generator to create that specific text portion highlighted. This permits the QA function to tie the QA issue back to the narrative text generator, presenting an edit function to permit a writer to later correct the branch, condition, or variation that generated the QA issue and resolve the QA issue.

Figure 5:
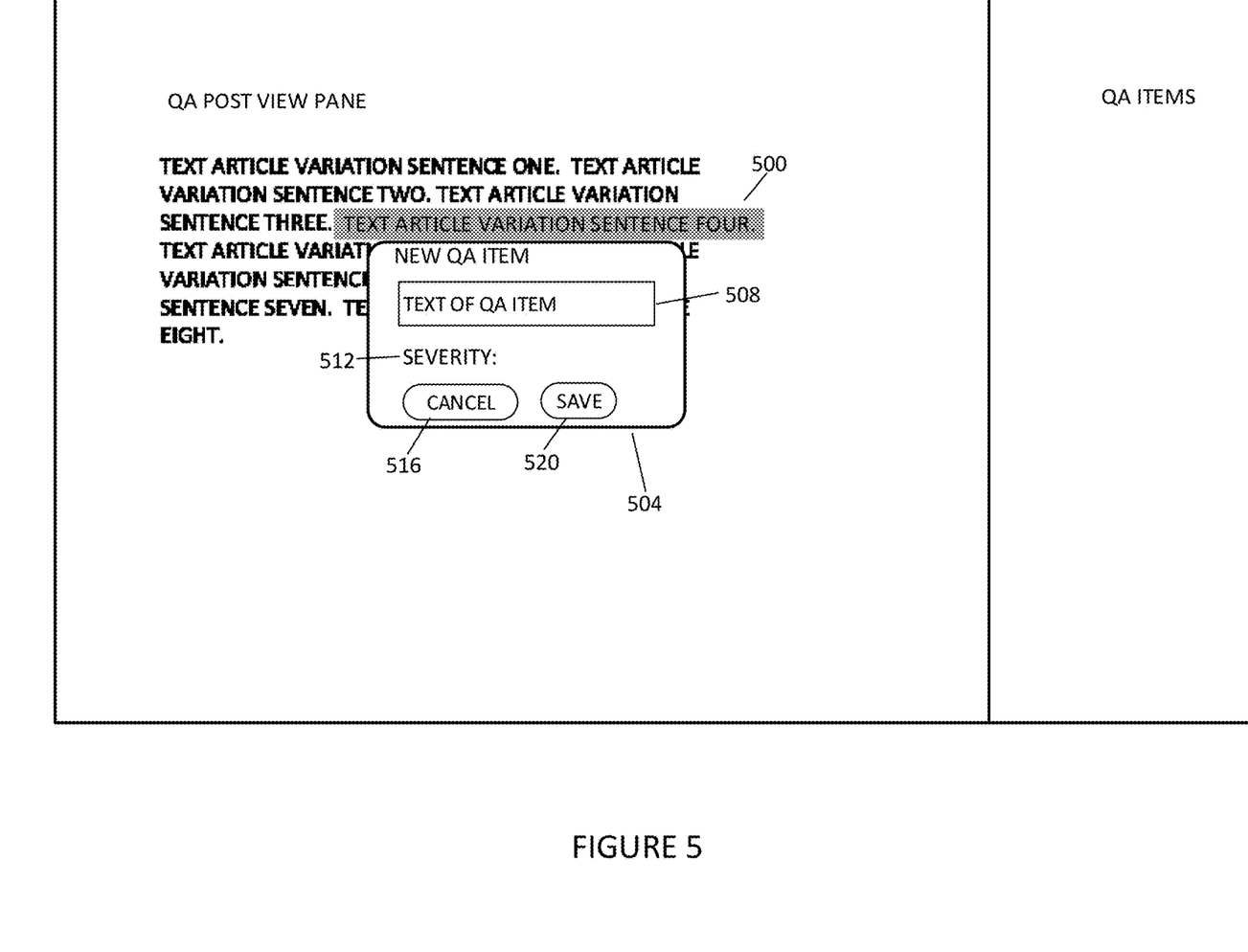
FIG. 5 is an exemplary view of the generation of a QA item to be addressed consistent with certain embodiments of the present invention.

With regard to FIG. 5, this figure presents an exemplary view of the generation of a QA item to be addressed consistent with certain embodiments of the present invention. In an exemplary embodiment, generating a new QA item for later resolution is accomplished by the QA user first highlighting the text within the post that is of concern 500. The QA user then selects the highlighted text to open a new QA item input box 504. The new QA item input box 504 permits the QA user to input a text string in the text of QA item sub-box 508. The input text string may be a note about why the highlighted text is in error. The QA user may also choose to input a severity rating 512 for the QA issue identified. In a non-limiting example, the severity rating may be input as a choice of severity ratings, as a number indicated the severity level on a pre-determined scale, as a toggle, or as any other rating method considered of use to the QA process.

The QA user may also choose to cancel 516 the input of the new QA item 504 for any reason by selecting the cancel 516 indicator within the new QA item 504 box. If the QA user is satisfied with the input text and severity indications for the new QA issue identified, the QA user may select the save 520 indicator to store the QA item in the QA log. This QA item will be logged for every instance of that branch, condition, and variation combination that was rendered in the post being processed. The QA log may be stored on the application server, or within any suitable storage device such as cloud storage memory, a database server, a network connected server or any other memory storage device in data communication with the QA process.

Figure 6:
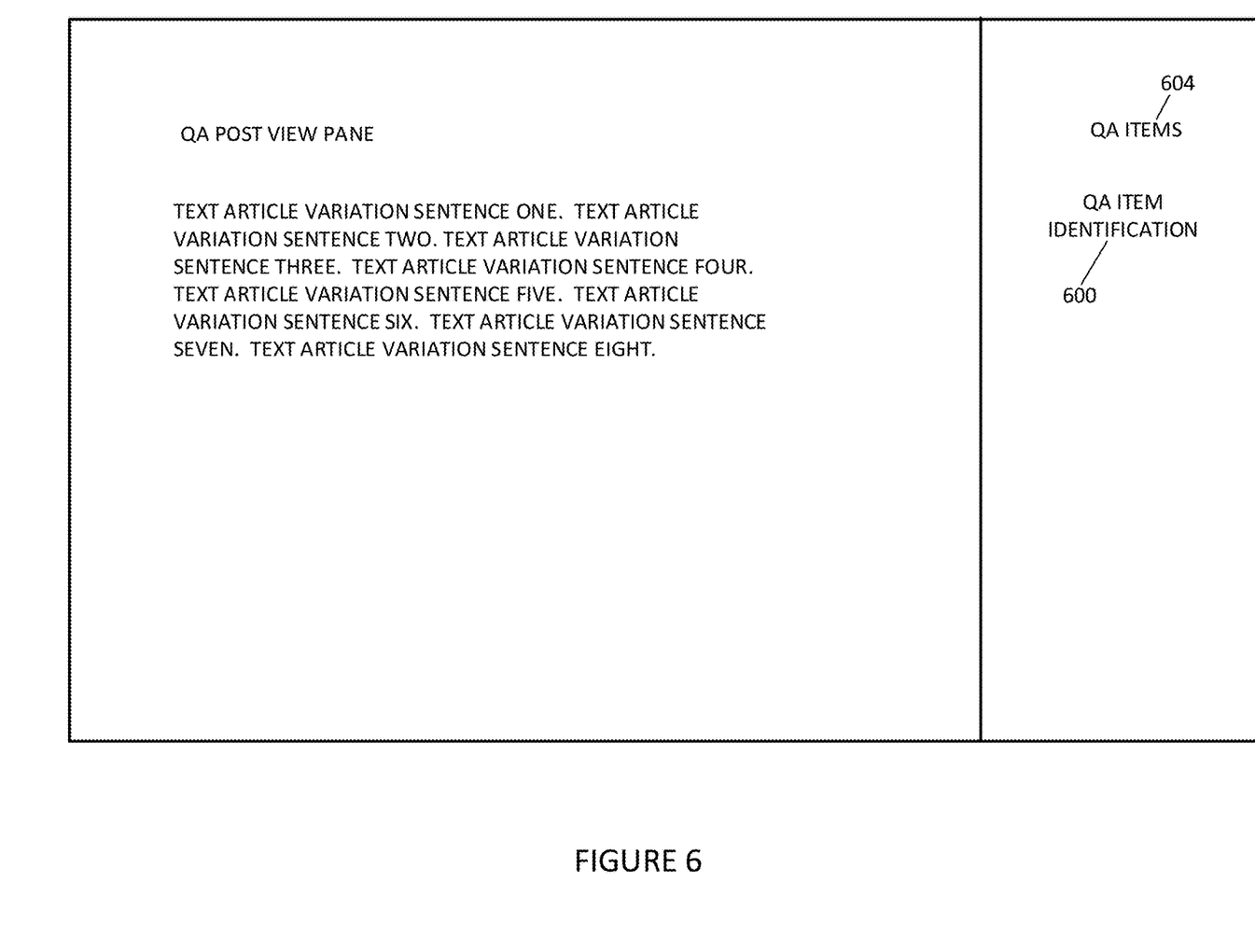
FIG. 6 is an exemplary view of a listing of identified QA issues within the displayed post consistent with certain embodiments of the present invention.

With regard to FIG. 6, this figure presents an exemplary view of a listing of identified QA issues within the displayed post consistent with certain embodiments of the present invention. Upon saving a QA issue within the QA log, the newly saved QA issue is listed as a QA item 600 within the rightmost pane of the display, designated as the QA items pane 604. The QA user may select the QA item 600 to review, edit, remove, or click on a link associated with the QA item generated by the QA process. Selecting the link associated with the QA item populates the display with the narrative text editor view focused directly on the branch, condition, and variation combination associated with that QA item. Upon opening the narrative text editor, the QA user may edit, remove, or otherwise update the branch, condition, and variation combination to resolve the issue. The update to the branch, condition, and variation combination will be propagated such that when a subsequent run is performed, the QA issue will be corrected for all subsequent posts that contain that branch, condition, and variation combination.

In an additional embodiment, the QA item log may be stored for later access by a different QA user or writer than the one who created the QA item. The QA item log may be transferred to a different user or writer who may be focused solely on resolving issues, or may have differing qualifications. Regardless of the rationale, the QA item log may be accessed at a later time than the QA items were created for processing. The process of correction, however, remains the same. The selection of a QA item opens the narrative text editor view for the particular branch, condition, and variation stored with the QA item. The user may then edit, remove, or otherwise correct the QA issue and have the corrections propagated through the system for use in future runs.

Figure 7:
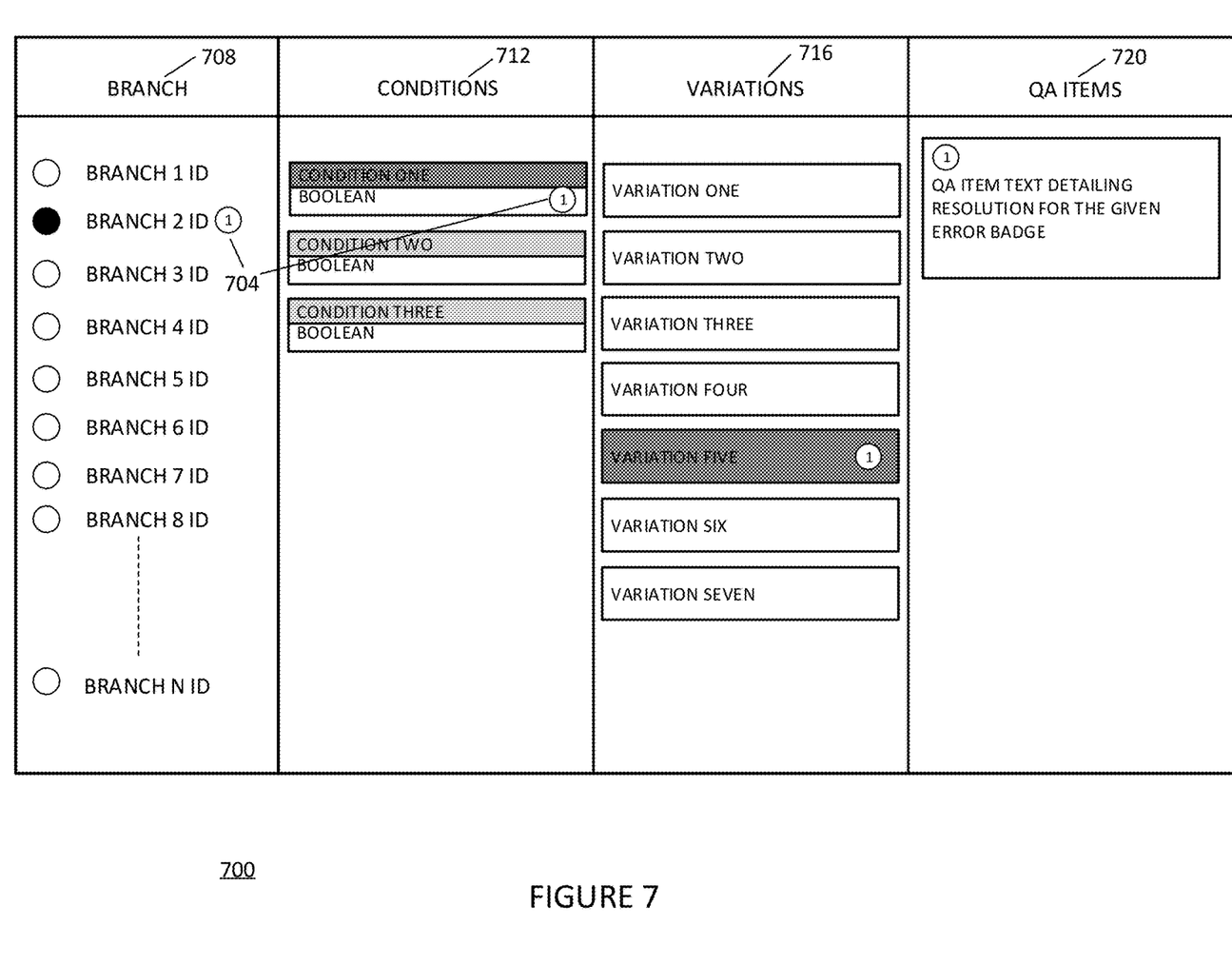
FIG. 7 is an exemplary view of a listing of identified QA issues in the narrative text editor view consistent with certain embodiments of the present invention.

With regard to FIG. 7, this figure presents an exemplary view of a listing of identified QA issues in the narrative text editor view consistent with certain embodiments of the present invention. In an exemplary embodiment, when QA items are to be corrected, after identification, a user is presented with a narrative text editor display 700 that presents one or more error badges 704. The error badges 704 may be any shape or color, but are generally represented as a simply graphical shape in a color that contrasts sharply with the background of the display and has displayed within the error badge a number indicating the error count for each branch 708, condition 712, and variation 716 in the narrative text generation framework used to create the post. Error badges may be associated with a branch 708, condition 712, variation 716, or any combination of these structures. The error badges 704 indicate how many total errors are associated with each branch 708, condition 712, and variation 716.

The user may select the error badge 704 to view that item. Upon selecting an error badge 704, the system may display a panel dedicated to explanations associated with QA issues 720. This QA panel 720 will display a description of the QA issue 724 for the branch 708, condition 712, or variation 716 associated with that particular error badge 704.

Upon completion of the QA review by a user, or third party designated by the user, generated posts are considered suitable for publication. The system may publish the completed posts on an automated schedule, the system administrator may choose to publish the completed posts on an ad hoc basis, or the completed posts may be stored for later publication, research, or other use.

Figure 8:
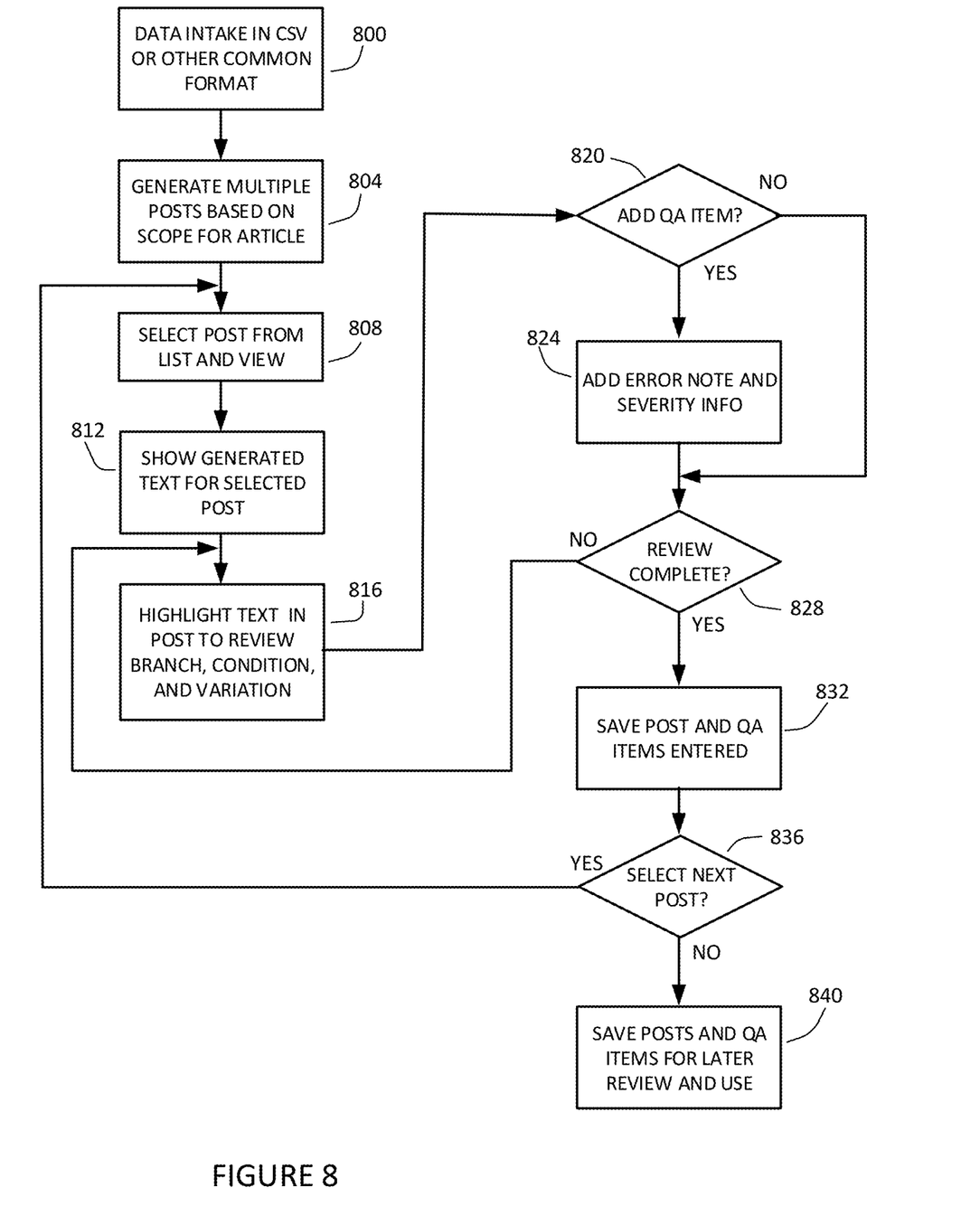
FIG. 8 is an exemplary view of a process flow for the operation of an automatic quality assurance locator and editing function consistent with certain embodiments of the present invention.

With regard to FIG. 8, this figure presents an exemplary view of a process flow for the operation of an automatic quality assurance locator and editing function consistent with certain embodiments of the present invention. In an exemplary embodiment, a quality assurance process begins with data intake in a CSV or other common data format, such as a spreadsheet 800. A user may generate select a range of data values and scopes and generate multiple posts of generated narrative text based upon the selected scope(s) 804. The user may select a particular post at 808 from a list of generated posts for a given run and view the text for the selected post in a QA post display. At 812, the system may display the dynamically generated narrative text for the particular scope for review. At 816, the user may then highlight text within the displayed post by moving a cursor or other indicator to select the text of interest. Moving the cursor or other indicator to highlight text causes the system to display the branch, condition, and variation combination that generated that particular text within the post. This branch, condition, and variation combination will also be associated with any QA items that may be created for the highlighted portion of the post.

The user, at 820, may decide to enter a new QA item to identify and comment upon a QA issue. If the user decides not to enter a QA item associated with the highlighted text, the user may move on to another section of the text or another post entirely. If the user decides to enter a new QA item, at 824, the system may present the user with a new QA item input box where the user may add the text of an error notice and record severity information for the new QA item.

At 828, the user may decide that the QA review for the particular post is complete. If the review is not yet completed to the user's satisfaction, the user may continue to highlight additional text within the post and create additional new QA items associated with such highlighted text. If the user is satisfied with the text and any added QA items for this selected post, the user may end their review of this particular post. At 832, when the user chooses to end the review of the selected post, the user selects an option to save the QA items and the post. Upon selection of the save option, the QA items created are logged to the QA item log and the user is provided with the option to continue the QA review process by displaying a list of available posts.

At 836, if the user wishes to continue to review additional posts, the user simply selects a post from the provided list and the user is then presented with the generated narrative text for that selected post. If the user has completed their review of the posts associated with this run, at 840 the user selects the terminate review option. Upon the termination of the QA review, the system stores the QA item log and all posts into one or more databases for later retrieval and use.

While certain illustrative embodiments have been described, it is evident that many alternatives, modifications, permutations and variations will become apparent to those skilled in the art in light of the foregoing description.

What is claimed is:

1. A computer-based method for optimizing and evaluating a quality of data driven computer-generated natural language text, comprising:
presenting to a user, on a first computer user interface display, samples of generated narrative text posts from a narrative content generation system, the samples including unique groupings of data configured from an application of one or more input data sources to pre-arranged conditions and a set of origin structures;
receiving a selection, from the user via the first computer user interface display, one sample of generated narrative text post of the samples of generated narrative text posts, the one sample of generated narrative text post comprising a set of customized segments of narrative text;
presenting, on a second computer user interface display, a computer-generated natural language text post corresponding to the one sample of generated narrative text post comprising the set of customized segments of narrative text;
receiving a user indication, via the second computer user interface display, for a segment of the computer-generated natural language text post and dynamically highlighting the segment; and
presenting, on a third computer user interface display, conditions and origin structure associated with the segment of the computer-generated natural language text post.

2. The computer-based method of claim 1, where the one or more input data sources comprise a relational database, a non-relational database, an excel file, a file in JSON format, an XML file, a spreadsheet, or a file in a comma separated value (CSV) format.

3. The computer-based method of claim 1, further comprising:

retrieving, from the one or more input data source, input data evaluated by the narrative content generation system in generating the segment; and presenting the retrieved input data via the third computer interface display.

4. The computer-based method of claim 1, further comprising:

receiving, from the user via the third computer user interface display, a notation that a quality assurance issue exists for the segment.

5. The computer-based method of claim 4, wherein the notation comprises a severity indicator.

6. The computer-based method of claim 1, further comprising:

receiving an edit to a condition selected by the user via the third computer user interface display; and causing the narrative content generation system to propagate the edited condition for future narrative content generation.

7. The computer-based method of claim 1, wherein the data sources comprises input data specific to a particular industry.

8. The computer-based method of claim 1, wherein dynamically highlighting the segment comprises highlighting the computer-generated natural language text post when a pointing device, such as a cursor, is positioned on said computer-generated natural language text post in the display, and the conditions and origin structure that generated the highlighted computer-generated natural language text post is presented.

9. A computer-implemented graphical user interface and narrative content quality assurance system for optimizing data driven natural language and evaluating dynamic generation of narrative text with a narrative language generation system, comprising:

a narrative content generation system for creating narrative text posts, comprising:

one or more data sources comprising input data for the narrative content generation system; and an application server for evaluating the input data against one or more pre-arranged conditions and for generating the narrative text posts, each narrative text post comprising a plurality of customized text segments based on evaluations and on a set of stored origin structures; and a computing device comprising a display unit, the computing device coupled to the narrative content generation system and operable to generate a first display for the display unit, the first display for representing generated narrative text and comprising:

a branch condition pane for presenting one or more conditions from the one or more pre-arranged conditions, and for receiving a user selection of one or more of the one or more pre-arranged conditions; and a content preview pane for presenting samples of the generated narrative text from the narrative content generation system, each sample post corresponding to an application of the input data to one of the one or more of the one or more pre-arranged conditions and the set of stored origin structures.

10. The computer-implemented graphical user interface and the narrative content quality assurance system of claim 9, further operable to receive a user selection of a sample post on the first display, and to generate a second display for the display unit, the second display comprising a post view pane for presenting one of the narrative text posts generated by the narrative content generation system and corresponding to the selected sample post.

11. The computer-implemented graphical user interface and the narrative content quality assurance system of claim 10, further operable to receive, via the post view pane, a user indication of one of the plurality of customized text segments in the presented narrative text post, and to generate a third display for the display unit, the third display for representing the conditions and origin structure used by the narrative content generation system in generating the indicated customized text segment for the presented narrative text post.

12. The computer-implemented graphical user interface and the narrative content quality assurance system of claim 11, wherein the system is in communication with the one or more data sources of the narrative content generation system, and the third display further representing, from the input data source, the evaluated input data associated with the indicated customized text segment.

13. The computer-implemented graphical user interface and the narrative content quality assurance system of claim 11, further operable to receive a notation from a user for a quality assurance issue associated with the indicated customized text segment.

14. The computer-implemented graphical user interface and the narrative content quality assurance system of claim 13, wherein the received notation includes a degree of severity for the quality assurance issue.

15. The computer-implemented graphical user interface and the narrative content quality assurance system of claim 13, the second display further comprising a QA issues log pane for presenting a list of noted quality assurance issues associated with the displayed narrative text post.

16. The computer-implemented graphical user interface and the narrative content quality assurance system of claim 13, further operable to dynamically highlight the customized text segment in the second display as the user hovers a cursor over a corresponding portion of the narrative text post, wherein dynamic highlighting comprises highlighting the customized text when a pointing device, such as a cursor, is positioned on said text in the display, and the conditions and origin structure that generated the highlighted text is presented.

17. The computer-implemented graphical user interface and the narrative content quality assurance system of claim 13, further operable to update one or more analytical metrics associated with one or more conditions used by the narrative content generation system in generating the indicated customized text segment.

18. The computer-implemented graphical user interface and the narrative content quality assurance system of claim 17 wherein updating the analytical metrics comprises incrementing and/or decrementing a counter.

19. The computer-implemented graphical user interface and the narrative content quality assurance system of claim 15, further operable to receive a user selection of a QA issue from the log pane, and to generate a display for representing the conditions and origin structure used by the narrative content generation system in generating the customized text segment associated with the selected QA issue.

20. The computer-implemented graphical user interface and the narrative content quality assurance system of claim 19, further operable to receive a user edit for one of the displayed conditions, and to update the corresponding origin structure with the edit in the narrative content generation system.

\* \* \* \* \*